US009682383B2

(12) United States Patent
Ergang et al.

(10) Patent No.: US 9,682,383 B2
(45) Date of Patent: *Jun. 20, 2017

(54) GAS STREAM TREATMENT PROCESS

(75) Inventors: Nicholas S. Ergang, Glen Ellyn, IL (US); Bruce A. Keiser, Plainfield, IL (US); Richard Mimna, Aurora, IL (US)

(73) Assignee: Nalco Company, Naperville, IL (US)

( * ) Notice: Subject to any disclaimer, the term of this patent is extended or adjusted under 35 U.S.C. 154(b) by 685 days.

This patent is subject to a terminal disclaimer.

(21) Appl. No.: 13/269,206

(22) Filed: Oct. 7, 2011

(65) Prior Publication Data

US 2012/0263634 A1    Oct. 18, 2012

Related U.S. Application Data

(63) Continuation of application No. 12/756,491, filed on Apr. 8, 2010, now Pat. No. 9,555,420.

(51) Int. Cl.
| | |
|---|---|
| *B03C 3/017* | (2006.01) |
| *B01D 53/02* | (2006.01) |
| *B01D 53/64* | (2006.01) |
| *B03C 3/011* | (2006.01) |

(52) U.S. Cl.
CPC ............ *B03C 3/017* (2013.01); *B01D 53/02* (2013.01); *B01D 53/64* (2013.01); *B03C 3/011* (2013.01); *B01D 2253/106* (2013.01); *B01D 2253/1128* (2013.01); *B01D 2253/25* (2013.01); *B01D 2257/602* (2013.01); *B01D 2258/0283* (2013.01); *B01D 2258/0291* (2013.01)

(58) Field of Classification Search
None
See application file for complete search history.

(56) References Cited

U.S. PATENT DOCUMENTS

| | | | |
|---|---|---|---|
| 4,094,777 A | 6/1978 | Sugier et al. | |
| 4,474,896 A | 10/1984 | Chao | |
| 5,164,095 A | 11/1992 | Sparapany et al. | |
| 5,334,564 A | 8/1994 | Pinnavaia et al. | |
| 5,346,627 A | 9/1994 | Siefert et al. | |
| 5,520,898 A | 5/1996 | Pinnavaia et al. | |
| 6,569,908 B2 | 5/2003 | Noguchi et al. | |
| 6,719,828 B1 * | 4/2004 | Lovell et al. | 95/134 |
| 6,808,692 B2 | 10/2004 | Oehr | |
| 6,808,768 B2 | 10/2004 | Satou et al. | |
| 6,878,358 B2 | 4/2005 | Vosteen et al. | |
| 7,524,472 B1 * | 4/2009 | Kong | 423/210 |
| 7,572,421 B2 | 8/2009 | Yang et al. | |
| 7,628,844 B2 * | 12/2009 | Hua | 95/134 |
| 2004/0045437 A1 * | 3/2004 | Chang et al. | 95/134 |
| 2005/0019240 A1 * | 1/2005 | Lu et al. | 423/210 |
| 2005/0238549 A1 | 10/2005 | Hammel | |
| 2006/0051270 A1 | 3/2006 | Brunette | |
| 2006/0120934 A1 | 6/2006 | Lanier et al. | |
| 2007/0095203 A1 * | 5/2007 | Paris et al. | 95/28 |
| 2007/0104631 A1 | 5/2007 | Durante et al. | |
| 2007/0122327 A1 | 5/2007 | Yang et al. | |
| 2007/0140940 A1 | 6/2007 | Varma et al. | |
| 2007/0231249 A1 | 10/2007 | Batllo et al. | |
| 2008/0011683 A1 | 1/2008 | Dong et al. | |
| 2008/0028932 A1 | 2/2008 | Biermann et al. | |
| 2008/0034968 A1 | 2/2008 | Nordberg et al. | |
| 2008/0121142 A1 * | 5/2008 | Comrie et al. | 106/707 |
| 2009/0047200 A1 * | 2/2009 | Holmes et al. | 423/242.1 |
| 2009/0101015 A1 | 4/2009 | Hua | |
| 2009/0320678 A1 * | 12/2009 | Chang et al. | 95/92 |
| 2010/0272621 A1 * | 10/2010 | Chang et al. | 423/210 |
| 2011/0076210 A1 | 3/2011 | Pollack et al. | |
| 2011/0195003 A1 | 8/2011 | Durham et al. | |
| 2011/0314821 A1 | 12/2011 | Bookbinder et al. | |

FOREIGN PATENT DOCUMENTS

| | | | |
|---|---|---|---|
| EP | 0271224 | * | 12/1987 |
| JP | H0889757 | | 4/1996 |
| JP | 2008533432 | | 8/2008 |
| WO | WO 2006/099509 A1 | | 9/2006 |
| WO | WO 2007/046822 A2 | | 4/2007 |
| WO | WO 2010/080602 A2 | | 7/2010 |

OTHER PUBLICATIONS

European Search Report for EP12838395.7 dated May 27, 2015.

* cited by examiner

*Primary Examiner* — Melvin C Mayes
*Assistant Examiner* — Sheng H Davis
(74) *Attorney, Agent, or Firm* — Eric D. Babych; Brinks Gilson & Lione

(57) ABSTRACT

A process of treating a gas stream containing at least one mercury compound or species, the process comprising: applying a composition into said gas stream ahead of a particulate matter collection device, wherein said composition contains a compound having the following formula $(SiO_2)_x(OH)_yM_zS_aF$, wherein (i) $SiO_2$ is an optional component; (ii) M comprises at least one of the following: boron, magnesium, aluminum, calcium, titanium, vanadium, manganese, iron, cobalt, nickel, copper, zinc, zirconium, molybdenum, palladium, silver, cadmium, tin, platinum, gold, and bismuth; (iii) S comprises a sulfur-based species selected from at least one of the following: sulfide salts, dithiocarbamates, polymer-based dithiocarbamates, and polysulfide salts; (iii) F is an optional component and comprises at least one of the following: a functionalized organosilane, a sulfur-containing organosilane, an amine-containing organosilane, and an alkyl-containing organosilane.

20 Claims, No Drawings

GAS STREAM TREATMENT PROCESS

CROSS REFERENCE TO RELATED APPLICATIONS

This is a continuation in part application of U.S. patent application Ser. No. 12/756,491, "Gas Stream Treatment Process," filed on Apr. 8, 2010, now U.S. Pat. No. 9,555,420, which is incorporated herein by reference in its entirety.

FIELD OF THE INVENTION

This disclosure pertains generally to a process of treating a gas stream containing at least mercury. More particularly, this invention relates to compounds comprising a metal or metalloid component, a sulfur-based component, and an optional silica-containing component. The invention has specific relevance to such compounds that absorb mercury or oxidize mercury present in gas streams.

BACKGROUND OF THE INVENTION

Mercury emission control is desired by the power generation industry. A more facile way of controlling mercury emission from heat generating systems is sought by the industry. An established methodology currently in practice for the control of mercury emissions is the addition of halogen containing compounds to fuels or to flue gases to enhance the oxidation of mercury, thereby facilitating its capture by sorbents and scrubber liquors (see U.S. Pat. No. 6,808,692 and U.S. Pat. No. 6,878,358, both of which are herein incorporated by reference).

SUMMARY OF THE INVENTION

The present invention accordingly provides for a composition comprising a compound having the following formula $(SiO_2)_x(OH)_y M_z S_a F$, where $SiO_2$ is an optional component. M comprises at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth. S comprises a sulfur-based species selected from at least one of the following: sulfide salts, dithiocarbamates, polymer-based dithiocarbamates, and polysulfide salts. In embodiments, S consists of at least one such sulfur-based species. F is an optional component and comprises at least one of the following: a sulfur-containing organosilane, an amine-containing organosilane, or an alkyl-containing organosilane at a surface area coverage of about 0.01 to about 100%. In embodiments, F consists of at least one such organosilane. In embodiments where the $SiO_2$ component is present, the molar ratio of y/x is equal to about 0.01 to about 0.5 and the molar ratio of x/z is equal to about 0.5 to about 300. In embodiments where the $SiO_2$ component is not present, y is 0 and Z is 1. The molar ratio of a/z is about 0.5 to about 5.

The present invention further provides for a composition comprising a compound having a formula of: $(SiO_2)_{15}(OH)_y \cdot Cu_1 S_5$, wherein y is the relative surface concentration of hydroxyl species as determined by residual moisture content.

The present invention further provides for a product produced by filtering an aqueous-based material from a composition comprising the disclosed compound.

In an embodiment, the present invention also provides for a product produced from drying the disclosed composition at a temperature of 100° C. to 350° C.

The present invention also provides for a method of forming a silica-containing product/composition comprising: a. providing a silica-containing precursor (SCP) contained in solution that has a pH less than or equal to a pH of about 7; b. optionally doping the SCP with one or more metal species, wherein said doping occurs when the solution has a pH less than or equal to a pH of about 7; c. adjusting the pH of the solution to greater than about 7; d. adding an effective amount of salt to the solution so that the conductivity of the solution is greater than or equal to about 4 mS, wherein said addition occurs prior to, simultaneous with, or after the pH adjustment in step 1c; e. optionally filtering and drying the SCP; and f. optionally reacting the dried product from step e with a functional group and optionally wherein the resultant functionalized dried product is at least one of the following: a functionalized metal oxide-doped or metal sulfide-doped silica-containing product.

The present invention also provides for a method of forming a silica-containing product/composition comprising: a, providing a silica-containing precursor (SCP) contained in solution that has a pH greater than about 7; b. adjusting the pH of the solution to less than or equal to about 7; c. optionally doping the SCP with one or more metal species, wherein said doping occurs when the solution has a pH less than or equal to a pH of about 7; d. adjusting the pH of the solution to greater than about 7; e. adding an effective amount of salt to the solution so that the conductivity of the solution is greater than or equal to about 4 mS, wherein said addition occurs prior to, simultaneous with, or after the pH adjustment in step 2d; f. optionally filtering and drying the SCP; and g. optionally reacting the dried product from step f with a functional group and optionally wherein the resultant functionalized dried product is at least one of the following: a functionalized metal oxide-doped or metal sulfide-doped silica-containing product.

The present invention also provides for a method of forming a metal sulfide product/composition that is silica-free comprising: a. providing a metal salt solution at a pH of less than or equal to about 7; b. adjusting the pH of the solution to greater than about 7, wherein the pH adjustment occurs with a sulfide source; c. adding an effective amount of salt to the solution so that the conductivity of the solution is greater than or equal to about 4 mS, wherein said addition occurs prior to, simultaneous with, or after the pH adjustment in step c; d. optionally filtering and drying the product; and e. optionally reacting the dried product from step d with a functional group and optionally wherein the resultant functionalized dried product is a functionalized metal sulfide product.

The present invention further provides for a process of treating a gas stream containing mercury. The process comprises applying the disclosed composition into said gas stream ahead of a particulate matter collection device. In embodiments, such application acts to adsorb, absorb, or oxidize at least a portion of the mercury or the mercury-containing compound present in the gas stream.

DETAILED DESCRIPTION OF THE INVENTION

As specified above, the present invention provides a composition that contains a compound with a sulfur component, specifically a compound having a formula of $(SiO_2)_x(OH)_y M_z S_a F$, where $SiO_2$ is an optional component. M comprises at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth. S comprises a sulfur-based species selected from at least one of the following: sulfide salts, dithiocarbamates, and polymer-based dithiocarbamates, polysulfide salts. It should be appreciated that M may comprise at least one of the recited metals, at least one of the recited metalloid cations, or a combination of both. In embodiments, S consists of at least one such sulfur-based species. F is an optional component and comprises at least one of the following: a functionalized organosilane, a sulfur-containing organosilane, an amine-containing organosilane, and an alkyl-containing organosilane at a surface area coverage of about 0.01 to about 100%. In embodiments, F consists of at least one such organosilance. It should be appreciated that surface area coverage of F refers to covering with F up to 100% of the remaining surface (i.e., using all of the silanol surface groups to attach an organosilane) that is available in the presence of the M component. In embodiments where $SiO_2$ is present, the molar ratio of y/x is equal to about 0.01 to about 0.5 and the molar ratio of x/z is equal to about 0.1 to about 300. In embodiments where $SiO_2$ is not present, y is 0 and Z is 1. The molar ratio of a/z is about 0.5 to about 5.

The compound can be in various forms and proportions relative to the components of the compositions. In addition, various products can contain the compounds encompassed by this invention. For example, the following compound embodiments can stand alone, be further modified by chemical and/or physical means, or integrated into other products, e.g. consumer or industrial products.

In another embodiment, the invention also provides for a composition comprising a compound having a formula of: $(SiO_2)_{15}(OH)_y \cdot Cu_1 S_5$ wherein y is the relative surface concentration of hydroxyl species as determined by the residual moisture content.

In another embodiment, the compound comprises about 3% to about 15% by weight in an aqueous-based material.

In another embodiment, the compound comprises about 15% to about 40% by weight in a wet cake form.

In another embodiment, the compound comprises about 40% to about 99% by weight in a powder form.

In another embodiment, the compound has a particle size of about 5 to about 200 μm containing aggregated nanoparticles ranging from about 3 to about 500 nm.

In another embodiment, the compound has a surface area of about 30 $m^2/g$ to about 800 $m^2/g$.

In another embodiment, the compound has a pore volume of about 0.3 cc/g to about 2.0 cc/g.

In another embodiment, a product is produced by filtering an aqueous-based material from a composition comprising the disclosed. In this embodiment, the disclosed compound comprises about 3% to about 15% by weight in an aqueous-based material. In an embodiment, the aqueous-based material is an aqueous based slurry.

In another embodiment, the product is produced from drying a composition comprising the disclosed compound at a temperature of about 100° C. to about 350° C.

The compounds can be made in various ways, such as U.S. Patent Application Publication No. 2007/0231249, which is herein incorporated by reference.

As stated above, the sulfur-containing products encompassed by this invention can be made by the following methods.

One methodology involves starting from an acidic starting point.

In one embodiment, the method comprises forming a silica-containing product comprising the steps of: a, providing a silica containing precursor (SCP) contained in solution that has a pH less than or equal to a pH of about 7; b. optionally doping the SCP with one or more metal species, wherein said doping occurs when the solution has a pH less than or equal to a pH of about 7; c. adjusting the pH of the solution to greater than about 7; d. adding an effective amount of salt to the solution so that the conductivity of the solution is greater than or equal to about 4 mS, wherein said addition occurs prior to, simultaneous with, or after the pH adjustment in step 1c; e. optionally filtering and drying the SCP; and f. optionally reacting the dried product from step e with a functional group and optionally wherein the resultant functionalized dried product is at least one of the following: a functionalized metal oxide-doped or metal sulfide-doped silica-containing product.

In another embodiment, the functional group in step f is an organosilane.

In another embodiment, the silicon-containing precursor is selected from at least one of the following: silicic acid, colloidal silica, tetraethylorthosilicate, and dispersed fumed silica.

In another embodiment, the pH range of the SCP in step 1(a) is from about 3 to about 4.

In another embodiment, the of the SCP is adjusted to greater than 7 by mixing/interacting the molecules of said SCP with an alkaline solution at a shear rate of 6 to 23 m/s based on tip speed. In another embodiment, the method further comprises adjusting the pH of the SCP to greater than 7 by mixing said SCP with an alkaline solution via a mixing chamber. It should be appreciated that any suitable mixing device or chamber may be used in the method of the invention. An example of a mixing chamber is described in U.S. Pat. No. 7,550,060, "Method and Arrangement for Feeding Chemicals into a Process Stream". This patent is herein incorporated by reference. In one embodiment, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can then be attached or in communication with a receptacle that holds/processes through (e.g. a conduit) a mixed product. In one embodiment, said mixing chamber can then be attached or in communication with a receptacle that holds/processes a mixed product resulting from said pH adjustment of said SCP.

Additionally, Ultra Turax, Model Number UTI-25 (available from IKA® Works, Inc, in Wilmington, N.C.), a mixing device, can be utilized.

It is envisioned that any suitable reactor or mixing device/chamber may be utilized in the method of the invention.

In another embodiment, the method further comprises adjusting the pH of the SCP to greater than about 7 by combining said SCP with an alkaline solution with mixing yielding a Reynolds Number greater than or equal to 2,000, to form the silica-containing product.

In another embodiment, the method further comprises adjusting the pH of the SCP to greater than about 7 by combining said SCP with an alkaline solution under transitional flow conditions (i.e., Reynolds Numbers between 2,000 and 4,000) to form the silica-containing product.

In another embodiment, the method further comprises adjusting the pH of the SCP to greater than 7 by combining said SCP with an alkaline solution under turbulent flow conditions (i.e., Reynolds Numbers greater than or equal to 4,000) to form the silica-containing product.

In another embodiment, the pH of the SCP is adjusted to a pH range of about 7 to about 11 with the use of a chemistry selected from at least one of the following: ammonium hydroxide, ammonium carbonate, mineral bases such as but not limited to sodium hydroxide and/or potassium hydroxide, organic bases such as but not limited to trimethylammonium hydroxide, alkaline silicates, sulfide salts such as but not limited to sodium sulfide, and polysulfide containing salts such as but not limited to calcium polysulfide and/or sodium polysulfide.

In another embodiment, the resulting slurry from step d is filtered and dried such that the solid concentration of said dried and filtered product is increased from about 5 wt % to about 99 wt %.

In another embodiment, the resulting slurry from step d is dried via injection into the flue gas ductwork such that the solid concentration of said dried product is increased from about 5 wt % to about 99 wt %.

In another embodiment, the dried product from step e is surface treated with an organosilane via controlled hydrolysis and condensation of the silane to the silica surface in at least one of the processes: an organic solvent, supercritical solvent, or solvent-free process.

Another methodology involves starting from an alkaline starting point.

In one embodiment, the method comprises forming a silica-containing product comprising the steps of: a. providing a silica containing precursor (SCP) contained in solution that has a pH greater than about 7; b. adjusting the pH of the solution to less than or equal to about 7; c. optionally doping the SCP with one or more metal species, wherein said doping occurs when the solution has a pH less than or equal to a pH of about 7; d. adjusting the pH of the solution to greater than about 7; e. adding an effective amount of salt to the solution so that the conductivity of the solution is greater than or equal to 4 mS, wherein said addition occurs prior to, simultaneous with, or after the pH adjustment in step 2d; f. optionally filtering and drying the SCP; and g. optionally reacting the dried product from step f with a functional group and optionally wherein the resultant functionalized dried product is at least one of the following: functionalized metal oxide-doped or metal sulfide-doped silica-containing product.

In another embodiment, the functional group in step g is an organosilane.

In another embodiment, the silicon-containing precursor is selected from at least one of the following: silicic acid, colloidal silica, alkaline silicates, tetraethylorthosilicate, and dispersed fumed silica.

In another embodiment, the pH of the silicon-containing precursor is adjusted through the use of at least one of the following: carbonic acid, an organic acid(s) such as but not limited to acetic acid, a mineral acid(s) such as but not limited to sulfuric acid and/or hydrochloric acid such that the pH is decreased to a range of from to about 2 to about 7.

In another embodiment, the pH range of the SCP is adjusted to a range of about 3 to about 4 with acetic acid.

In another embodiment, the pH of the SCP is adjusted to a pH range of about 7 to about 11 with the use of a chemistry selected from at least one of the following: ammonium hydroxide, ammonium carbonate, mineral bases, organic bases, alkaline silicates, sulfide salts, and polysulfide containing salts.

In another embodiment, the resulting slurry from step e is filtered and dried such that the solid concentration of said dried and filtered product is increased from about 5 wt % to about 99 wt %.

In another embodiment, the resulting slurry from step e is dried via injection into the flue gas ductwork such that the solid concentration of said dried product is increased from about 5 wt % to about 99 wt %.

In another embodiment, the dried product from step f is surface treated with an organosilane via controlled hydrolysis and condensation of the silane to the silica surface in at least one of the following: an organic solvent, supercritical solvent, or solvent-free process.

In another embodiment, the pH of the SCP is adjusted to greater than 7 by mixing said SCP with an alkaline solution at a shear rate of 6 to 23 m/s based on tip speed.

In another embodiment, the method further comprises adjusting the pH of the SCP to greater than about 7 by mixing said SCP with an alkaline solution via a mixing chamber. An example of a mixing chamber is described in U.S. Pat. No. 7,550,060, "Method and Arrangement for Feeding Chemicals into a Process Stream". This patent is herein incorporated by reference. In one embodiment, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can then be attached or in communication with a receptacle that holds/processes through (e.g. a conduit) a mixed product. In one embodiment, said mixing chamber can then be attached or in communication with a receptacle that holds/processes a mixed product resulting from said pH adjustment of said SCP.

Additionally, Ultra Turax, Model Number UTI-25 (available from IKA® Works, Inc. in Wilmington, N.C.), a mixing device, can be utilized. It is envisioned that any suitable reactor or mixing device/chamber may be utilized in the method of the invention.

In another embodiment, the method further comprises adjusting the pH of the SCP to greater than about 7 by combining said SCP with an alkaline solution with mixing yielding a Reynolds Number greater than or equal to 2,000, to form the silica-containing product.

In another embodiment, the method further comprises adjusting the pH of the SCP to greater than about 7 by combining said SCP with an alkaline solution under transitional flow conditions (i.e., Reynolds Numbers between 2,000 and 4,000) to form the silica based product.

In another embodiment, the method further comprises adjusting the pH of the SCP to greater than 7 by combining said SCP with an alkaline solution under turbulent flow conditions (i.e., Reynolds Numbers greater than or equal to 4,000) to form the silica-containing product. The sulfur-based species of the present invention may be selected from a representative list but not intended to be a limiting list of at least one of the following: sulfide salts, dithiocarbamates, polymer-based dithiocarbamates, and polysulfide salts. Sulfide salts maybe but not limited to sodium sulfide, potassium sulfide, and/or metal sulfides such as copper sulfide. Dithiocarbamates may be but not limited to dimethyldithiocarbamate (DMDTC) or diethyldithiocarbamate (DEDTC). Polymer-based dithiocarbamates contain organic polymers containing the functional group $R_nCS_2$, wherein R is an alkyl group which is linear or branched. An example of a commercially available polymer-based dithiocarbamate is described in U.S. Pat. Nos. 5,164,095 and 5,346,627, which are herein incorporated by reference. Polysulfides that can be used in the present invention include, but are not limited to, sodium polysulfide and calcium polysulfide.

The invention further provides for a composition in which the silica-containing precursor is agglomerated with a metal oxide dopant such that the final discrete silica-containing particle contains a homogeneous dispersion of metal oxide particles in a high surface area, high pore volume structure. The homogeneous dispersion of discrete metal oxide particles throughout the silica-containing particle framework is expected to provide more reactive surface area for a given metal oxide than a neat metal oxide particle.

In an embodiment, the invention provides a methodology that involves starting from an acidic starting point without the presence of an (SCP).

In one embodiment, the method comprises forming a sulfur-based product comprising the steps of a, providing a metal salt solution at a pH less than or equal to a pH of about 7; b. adjusting the pH of the solution to greater than about 7, wherein the pH adjustment occurs with a sulfide source; c. adding an effective amount of salt to the solution so that the conductivity of the solution is greater than or equal to about 4 mS, wherein said addition occurs prior to, simultaneous with, or after the pH adjustment in step b; d. optionally filtering and drying the slurry; and e. optionally reacting the dried product from step d with a functional group and optionally wherein the resultant functionalized dried product is a metal sulfide product.

In another embodiment, the functional group in step e is an organosilane.

In another embodiment, the pH range of the metal salt solution in step 1(a) is from about 2 to about 6.

In another embodiment, the pH of the metal salt solution is adjusted to greater than about 7 by mixing/interacting the molecules of said metal salt with an alkaline solution at a shear rate of about 6 to about 23 m/s based on tip speed. In another embodiment, the method further comprises adjusting the pH of the metal salt solution to greater than about 7 by mixing said metal salt solution with an alkaline solution via a mixing chamber. An example of a mixing chamber is described in U.S. Pat. No. 7,550,060. "Method and Arrangement for Feeding Chemicals into a Process Stream." This patent is herein incorporated by reference. In one embodiment, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can then be attached or in communication with a receptacle that holds/processes through (e.g. a conduit) a mixed product. In one embodiment, said mixing chamber can then be attached or in communication with a receptacle that holds/processes a mixed product resulting from said pH adjustment of said metal salt solution.

Additionally, Ultra Turax, Model Number UTI-25 (available from IKA® Works, Inc. in Wilmington, N.C.), a mixing device, can be utilized. it is envisioned that any suitable reactor or mixing device/chamber may be utilized in the method of the invention.

In another embodiment, the method further comprises adjusting the pH of the metal salt solution to greater than about 7 by combining said metal salt solution with an alkaline solution comprising a sulfide source with mixing yielding a Reynolds Number greater than or equal to 2000, to form the sulfur-based product.

In another embodiment, the method further comprises adjusting the pH of the metal salt solution to greater than about 7 by combining said metal salt solution with an alkaline solution comprising a sulfide source under transitional flow conditions (i.e., Reynolds Numbers between 2,000 and 4,000) to form the sulfur-based product.

In another embodiment, the method further comprises adjusting the pH of the metal salt solution to greater than about 7 by combining said metal salt solution with an alkaline solution comprising a sulfide source under turbulent flow conditions (i.e., Reynolds Numbers greater than or equal to 4,000) to form the sulfur-based product.

In another embodiment, the pH of the metal salt solution is also adjusted to a pH range of about 7 to about 11 with the use of a chemistry selected from at least one of the following: ammonium hydroxide, ammonium carbonate, mineral bases such as but not limited to sodium hydroxide and/or potassium hydroxide, organic bases such as but not limited to trimethylammonium hydroxide, alkaline silicates, sulfide salts such as but not limited to sodium sulfide, and polysulfide containing salts such as but not limited to calcium polysulfide and/or sodium polysulfide.

In another embodiment, the resulting slurry from step c is filtered and dried such that the solid concentration of said dried and filtered product is increased from about 5 wt % to about 99 wt %.

In another embodiment, the resulting slurry from step c is dried via injection with an atomizer or spray nozzle into the flue gas ductwork such that the solid concentration of said dried product is increased from about 5 wt % to about 99 wt %.

In another embodiment, the dried product from step e is surface treated with an organosilane via controlled hydrolysis and condensation of the silane to the silica surface in at least one of the processes: an organic solvent, supercritical solvent, or solvent-free process.

Organosilanes that can be used in the current invention are well known in the art and may be represented generally by $R_{(4-a)}—SiX_a$, wherein a may be from 1 to 3. The organofunctional group, R—, may be any aliphatic or alkene containing functionalized group such as propyl, butyl, 3-chloropropyl, amine, thiol, and combinations thereof. X is representative of a hydrolysable alkoxy group, typically methoxy or ethoxy. Some examples are 3-thiopropyl and mercaptopropyl silanes.

During the preparation of the composition of this invention, salt is added to increase the conductivity of the reaction solution to 4 mS. Examples of the salts that can be used include, but are not limited to, alkali and alkaline halides, sulfates, phosphates, and nitrates such as sodium sulfite, potassium chloride, sodium chloride, sodium nitrate, calcium sulfate, and potassium phosphate. One skilled in the art would recognize that the effective amount of salt added to reach the desired conductivity will vary dependent on the salt of choice.

Thiols and amines are represented generally by the class of organic and inorganic compounds containing the amine or thiol group having the general formula —B—(SH) or —B—(NH$_2$), wherein B is a linear or branched group consisting of carbon atoms such as —(CH$_2$)$_n$—, wherein n is from 1 to 15, in particular where a is 1 to 6, and most preferred where n is 3.

The silica-containing chemistry or the silica free chemistry can be applied to a variety of processes.

As stated above, this disclosure pertains to a process of treating a gas stream containing mercury, comprising: applying the disclosed composition into said gas stream ahead of a particulate matter collection device.

In an embodiment, the composition adsorbs at least a portion of at least one mercury-containing compound in the gas stream.

In an embodiment, the composition absorbs at least a portion of at least one adsorbed mercury-containing compound in the gas stream.

In an embodiment, the composition oxidizes at least one mercury-containing compound in the gas stream.

Use herein of the term "sorbent," "slurry," or the like is intended to encompass the disclosed composition as an adsorbent, absorbent, or oxidizer.

In one embodiment, the particulate matter collection device is one or more of the following devices: electrostatic precipitation (ESP), filtration, inertial separation, baghouse, cyclone, spray drier absorber (SDA), wet fluegas desulfurizer (wFGD) or any combination thereof.

In another embodiment, the gas stream is derived a heat generating system containing at least one of the following heat generating systems: a combustion system; a power plant combustion system; a coal combustion system; a waste incineration system; a kiln; a kiln for mining operations; a recovery boiler; a coal gasification process stream; a gas production stream, biomass combustion system, and an ore processing system.

In another embodiment, the sorbent is exposed to the gas stream by applying said sorbent into the gas stream with a carrier gas; optionally wherein said carrier gas is air or nitrogen; optionally wherein said carrier gas is applied upstream of the particulate control device; and optionally wherein said particulate matter collection device contains at least one of the following devices: ESP, baghouse, or cyclone.

In another embodiment, the composition of the invention comprises a sorbent slurry (e.g., a liquid or aqueous slurry) which is applied to the gas stream via injection of said slurry with an atomizer or spray nozzle into the gas stream with a carrier gas such that the liquid slurry is dispersed into controlled droplets.

In another embodiment, the sorbent is applied to the gas stream by application as a slurry blended with alkaline sulfur oxide sorbents such as but not limited to trona, calcium hydroxide, lime, hydrated lime, or calcium oxide containing compounds or materials or combinations thereof such as described in U.S. Pat. No. 5,334,564 and U.S. Pat. No. 5,520,898, which are herein incorporated by reference, e.g. via a spray dryer.

In another embodiment, the sorbent slurry is applied to the gas stream by application as a slurry blended with alkaline sulfur oxide sorbents such as but not limited to trona, calcium hydroxide, lime, hydrated lime, or calcium oxide containing compounds or materials or combinations thereof such as described in U.S. Pat. No. 5,334,564 and U.S. Pat. No. 5,520,898, which are herein incorporated by reference (e.g., via a spray dryer).

In another embodiment, the sorbent or sorbent slurry are mixed with an alkaline sulfur oxide sorbent slurry in a slurry holding tank, feed tank, recirculation line, feed line, or in-line with a mixing chamber prior to application of the slurry to the gas stream. In one embodiment, the mixing chamber comprises a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber. The mixing chamber can then be attached or in communication with a receptacle that holds/processes through (e.g. a conduit) a mixed product.

In another embodiment, the alkaline sulfur oxide sorbent is applied upstream of the sorbent. In a further embodiment, the sulfur oxide alkaline-containing sorbent is added separately from the sorbent by such methods as FSI (Furnace Sorbent Injection).

In another embodiment, the sorbent is applied to the gas stream by housing the sorbent in a fixed bed apparatus through which the gas stream is made to pass.

In another embodiment, the sorbent is combined with other inorganic sorbents such as aluminosilicates, silica-containing materials, or zeolites or combinations thereof from 1 to 50%.

In another the embodiment, the sorbent composition further comprises 1-50% activated carbon.

In another embodiment, the sorbent is blended in a ratio of 1-50% with activated carbon that is produced by the Thief Carbon process as described in U.S. Pat. No. 6,521,021, and which is herein incorporated by reference.

In another embodiment, the sorbent composition further comprises 1-50% of a silica based or aluminosilicate based mercury sorbent such as that described in U.S. Pat. No. 7,572,421, and which is herein incorporated by reference.

In another embodiment, the process further comprises: applying an oxidizing agent to the flue gas.

In another embodiment, the oxidizing agent is applied prior to said sorbent.

In another embodiment, the oxidizing agent is selected from the group consisting of: a thermolabile molecular halogen, calcium bromide, and halogen-containing compounds such as but not limited to hydrogen bromide, hydrogen chloride, ammonium bromide, ammonium chloride, sodium chloride, sodium bromide, calcium chloride or combinations thereof.

In another embodiment, there are a plurality of particulate collection devices; optionally wherein one of said particulate collection devices are positioned subsequent to another particulate collection device.

In another embodiment, sorbent is regenerated by heating the sorbent to at least 500° C. to desorb the mercury that has been absorbed onto the sorbent.

In another embodiment, the sorbent or sorbent in combination with other materials is contained within the fiber bag used in the filter baghouse.

In another embodiment, the sulfur oxide alkaline-containing sorbent is added separately from the sorbent by such methods as FSI.

In another embodiment, the sorbent is combined with other inorganic mercury sorbents such as but not limited to natural or synthetic aluminosilicates, zeolites, or silica-based materials.

In another embodiment, the activated carbon is replaced with or mixed with halogenated activated carbon which may be but not limited to chlorinated activated carbon or brominated activated carbon.

In another embodiment, the activated carbon is prepared from carbon based starting materials such as but not limited to coal, lignite, wood, wood byproducts, or bark.

In another embodiment, the method of application of the sorbent or a composition to a gas stream for controlling mercury emission and speciation can be achieved through various methods known in the art, for example, through a lance, an additional medium such as a fuel source, e.g. coal, a conveyor belt, one or ports in communication with a combustion system, e.g. asymmetrically placed ports.

In another embodiment, the gas stream contains at least one of the following halogens: chloride, bromide, iodide, and salts thereof.

In another embodiment, the oxidizing agent is combined with said sorbent prior to said treatment of said flue gas.

In another embodiment, the oxidizing agent is applied to the gas stream at least at one of the following time points: prior to, after, and at the same time of said application of said sorbent to the flue gas.

In another embodiment, the oxidizing agent is conveyed into the gas stream through one or mediums.

In another embodiment, the medium is coal and said gas stream derives from at least a coal combustion system.

In another embodiment, the sorbent further contains one or more halogens.

In another embodiment, the sorbent is capable of being traced in said gas stream.

In another embodiment, the sorbent contains one or more moieties or contains one or more functional groups capable of being quantitated by one or more analytical techniques or quantitation protocols.

In another embodiment, the moieties are magnetic. For example, the magnetic moieties are incorporated into the silica-containing particles as described in this disclosure and equivalents thereof. One of ordinary skill in the art would be able to incorporate the moieties, e.g., magnetic moieties into the particle, e.g. silica-containing particle.

In another embodiment, the sorbent is monitored by fluorescence and/or absorbance measurements.

In another embodiment, the method further comprises monitoring mercury emissions system and responding with the addition of said sorbent in accordance with the mercury levels in said system.

Example 1

In this example, 2180 g of 7 wt % silicic acid was added to a heel containing 450 g deionized (DI) water and 150 g of silicic heated to 90° C. The silicic acid was fed at 10 ml/min for 3 h via a peristaltic pump into a 5 L reaction flask.

A solution containing 16.4 g of 25 wt % ammonia solution and 5.84 g ammonium carbonate was prepared in 24.6 g DI water. The solution was added to the reaction flask quickly whereupon the viscosity of the solution increased significantly. The mixture was stirred for 30 minutes, then any remaining silicic acid was fed at 20 ml/mm. Upon completion of the silicic acid feed, the heating was turned off and the solution was allowed to cool.

The silica slurry was filtered and freeze-dried at 150° C. to produce a dry powder. Nitrogen sorption analysis of the powder was performed on an Autosorb-1C unit from Quantachrome. The sample was degassed at 300° C. for 2 h, then characterized by a multi-point BET (Brunauer, Emmett, and Teller—a surface area test) surface area, total pore volume, and BJH (Barrett-Joyner-Halenda) adsorption pore size distribution. Physical data indicated a surface area of 354 square meters per gram, a pore volume of 1.19 cc/g, and a pore diameter of 13.5 nm.

Example 2

In this example, 1414 g of 8.3 wt % silicic acid was added to a heel containing 16.3 g copper sulfate, 400 g DI water, and 200 g silicic acid heated to 90° C. The silicic acid was fed at 8 ml/min for 3 h via a peristaltic pump into a 5 L reaction flask.

A solution containing 17.3 g sodium sulfide and 11.8 g of 25 wt % ammonia was prepared in 200 g DI water. The solution was quickly added to the reaction flask after 3 h of silicic acid feed where the viscosity of the solution increased significantly. The mixture was stirred for 30 minutes, then any remaining silicic acid was fed at 16 ml/min. Upon completion of the silicic acid feed, the heating was turned off and the solution was allowed to cool.

The CuS-doped silica slurry was filtered and dried at 105° C. to produce a dry powder. Nitrogen sorption analysis of the powder was performed on an Autosorb-1C unit from Quantachrome. The sample was degassed at 105° C. for 4 h, then characterized by a multi-point BET surface area, total pore volume, and BJH adsorption pore size distribution. Nitrogen sorption analysis indicated a surface area of 321 square meters per gram, a pore volume of 1.46 cc/g, and a pore diameter of 18.2 nm.

Example 3

In this example, three solutions were prepared: A) 12 kg Nalco N8691 silica sol, B) 396 g copper sulfate and 360 g glacial acetic acid dissolved in 5.24 kg DI water, and C) 1.1 kg calcium polysulfide solution and 900 g of 25 wt % ammonia dissolved in 16 kg DI water. Solution B was added to solution A, followed by subsequent addition of solution C at a high shear rate. The mixture was stirred for 1-2 minutes before filtration. Nalco N8691 can be obtained from Nalco Company, 1601 West Diehl Road, Naperville, Ill., 60563.

The CuS-doped silica slurry was filtered and flash-dried at 565° F. to produce a dry powder. Nitrogen sorption analysis of the powder was performed on an Autosorb-1C unit from Quantachrome. The sample was degassed at 105° C. for 4 h, then characterized by a multi-point BET surface area, total pore volume, and BJH adsorption pore size distribution. Nitrogen sorption analysis indicated a surface area of 227 square meters per gram, a pore volume of 0.45 cc/g, and a pore diameter of 7.9 nm.

Example 4

In this example, three solutions are prepared: A) 2 kg Nalco N8691 silica sol, B) 53.2 g ferric sulfate and 60 g glacial acetic acid dissolved in 887 g DI water, and C) 184 g calcium polysulfide solution and 150 g of 25 wt % ammonia dissolved in 2667 g DI water. Solution B is added to solution A, followed by subsequent addition of solution C at a high shear rate. The mixture is stirred for 1-2 minutes before filtration. The iron sulfide-doped silica slurry is then filtered and flash-dried at 565° F. to produce a dry powder.

Example 5

In this example, two solutions are prepared: A) 1.65 g copper sulfate dissolved in 25 g DI water and B) 4.6 g calcium polysulfide solution and 0.5 g ammonium carbonate diluted in 25 g DI water. Solution B is added to solution A at a high shear rate. The mixture is stirred for 1-2 minutes prior to injection into the gas stream.

Example 6

The sorbent is injected into the flue gas of a coal fired power plant at a location between the air preheater and the particulate control device. To carry out the injection, the sorbent is fed from a feeding silo and pneumatically carried through injection lances positioned within the flue gas duct work thereby affording a fine dispersion of the material within the flue gas, covering the entire cross-sectional area of the duct. Sorbent feed rates are determined gravimetrically and set in the range of 0.1 to 10 lb/MMacf according to the desired mercury capture targets. The capture of mercury from the flue gas by the sorbent is verified by measurements of flue gas mercury concentrations made by Appendix K sorbent traps and continuous mercury emission monitors (Hg-CEMs), as well as by measurement of the level of mercury in ash.

COMBINATIONS OF COMPONENTS DESCRIBED IN PATENT APPLICATION

In one embodiment, the composition of matter claims include various combinations of sorbent components and associated compositions, such molar ratios of constituent particles. In a further embodiment, the claimed compositions include combinations of the dependent claims. In a further embodiment, a range or equivalent thereof of a particular component shall include the individual component(s) within the range or ranges within the range.

In another embodiment, the method of use claims include various combinations of the sorbent components and associated compositions, such molar ratios of constituent particles. In a further embodiment, the claimed methods of use include combinations of the dependent claims. In a further embodiment, a range or equivalent thereof of a particular component shall include the individual component(s) within the range or ranges within the range.

In another embodiment, the method of manufacture claims include various combinations of the sorbent components and associated compositions, such pH control. In a further embodiment, the claimed methods of use include combinations of the dependent claims. In a further embodiment, a range or equivalent thereof of a particular component shall include the individual component(s) within the range or ranges within the range.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more," For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A process of treating a gas stream containing mercury, comprising: applying a composition into said gas stream ahead of a particulate matter collection device, in order to adsorb at least a portion of a mercury containing compound, wherein said composition comprises a compound having the following formula $(SiO_2)_x(OH)_yM_zS_aF$: wherein M is at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth; wherein S is a sulfur-based species selected from at least one of the following: sulfide salts selected from sodium sulfide, potassium sulfide, and metal sulfide, dithiocarbamates selected from dimethyldithiocarbamate and diethyldithiocarbamate, polymer-based dithiocarbamates containing the functional group $R_nCS_2$ wherein R is an alkyl group which is linear or branched, and polysulfide salts selected from sodium polysulfide and calcium polysulfide; wherein M and S are embedded within the composition; F is an optional component and if present comprises at least one of the following: a functionalized organosilane, a sulfur-containing organosilane, an amine-containing organosilane, and an alkyl-containing organosilane at a surface area coverage of 0.01-100%; (iv) the molar ratio of y/x is equal to about 0.01 to about 0.5 and the molar ratio of x/z is equal to about 3 to about 300 if $SiO_2$ is present, and if $SiO_2$ is absent X is 0 and Z is 1; and (v) the molar ratio of a/z is about 0.5 to about 5.

2. A process of treating a gas stream containing mercury, comprising: applying a composition into said gas stream ahead of a particulate matter collection device, in order to adsorb at least a portion of a mercury containing compound, wherein said composition comprises an amorphous compound having the following formula $(SiO_2)_x(OH)_yM_zS_aF$: wherein M comprises copper and optionally one or more of the following metal or metalloid cations: boron, magnesium, aluminum, calcium, titanium, vanadium, manganese, iron, cobalt, nickel, zinc, zirconium, molybdenum, palladium, silver, cadmium, tin, platinum, gold, and bismuth; wherein S is a sulfur-based species comprising a polysulfide salt and optionally a sulfide salt selected from sodium sulfide, potassium sulfide, and metal sulfide, dithiocarbamates selected from dimethyldithiocarbamate and diethyldithiocarbamate, and polymer-based dithiocarbamates containing the functional group $R_nCS_2$ wherein R is an alkyl group which is linear or branched; F is an optional component and if present comprises at least one of the following: a functionalized organosilane, a sulfur-containing organosilane, an amine-containing organosilane, and an alkyl-containing organosilane at a surface area coverage of 0.01-100%; (iv) the molar ratio of y/x is equal to about 0.01 to about 0.5 and the molar ratio of x/z is equal to about 0.1 to about 300 if $SiO_2$ is present, and if $SiO_2$ is absent X is 0 and Z is 1; and (v) the molar ratio of a/z is about 0.5 to about 5.

3. The process of claim 1, further comprising adsorbing or oxidizing at least a portion of the at least one mercury compound or species.

4. The process of claim 1, wherein said particulate matter collection device is one or more of the following devices: electrostatic precipitation (ESP), filtration, inertial separation, baghouse, cyclone, and spray drier absorber or wet flue gas desulfurizer.

5. The process of claim 1, wherein said gas stream derives from a heat generating system and wherein said heat generating system is at least one of the following: a combustion system; a power plant combustion system; a coal combustion system; a waste incineration system; a kiln; a kiln for mining operations; a recovery boiler; a coal gasification process stream; a gas production stream, biomass combustion system, and an ore processing system.

6. The process of claim 1, wherein the composition comprises a sorbent slurry and the sorbent slurry is applied to the gas stream via injection of the sorbent slurry with an atomizer or spray nozzle into the gas stream such that the sorbent slurry is dispersed into controlled droplets.

7. The process of claim 1, wherein the composition is applied to the gas stream by application as a slurried blend with alkaline sulfur oxide sorbents applied either simultaneously or separately.

8. The process of claim 7, wherein the composition or slurried blend is mixed with the alkaline sulfur oxide sorbent slurry in a holding tank, feed tank, recirculation line, feed line, or mixing chamber prior to application of the slurry to the gas stream.

9. The process of claim 1, further comprising applying an oxidizing agent to the flue gas either before or after the composition is applied to the gas stream.

10. The process of claim 9, wherein said oxidizing agent comprises at least one of the following: a thermolabile molecular halogen, calcium bromide, a halogen-containing compound, and combinations thereof.

11. The process of claim 1, further comprising monitoring mercury emissions system and responding with the addition of said composition in accordance with the mercury levels in said system.

12. The process of claim 2, further comprising adsorbing or oxidizing at least a portion of the at least one mercury compound or species.

13. The process of claim 2, wherein said particulate matter collection device is one or more of the following devices: electrostatic precipitation (ESP), filtration, inertial separation, baghouse, cyclone, and spray drier absorber or wet flue gas desulfurizer.

14. The process of claim 2, wherein said gas stream derives from a heat generating system and wherein said heat generating system is at least one of the following: a combustion system; a power plant combustion system; a coal combustion system; a waste incineration system; a kiln; a kiln for mining operations; a recovery boiler; a coal gasification process stream; a gas production stream, biomass combustion system, and an ore processing system.

15. The process of claim 2, wherein the composition comprises a sorbent slurry and the sorbent slurry is applied to the gas stream via injection of the sorbent slurry with an atomizer or spray nozzle into the gas stream such that the sorbent slurry is dispersed into controlled droplets.

16. The process of claim 2, wherein the composition is applied to the gas stream by application as a slurried blend with alkaline sulfur oxide sorbents applied either simultaneously or separately.

17. The process of claim 16, wherein the composition or slurried blend is mixed with the alkaline sulfur oxide sorbent slurry in a holding tank, feed tank, recirculation line, feed line, or mixing chamber prior to application of the slurry to the gas stream.

18. The process of claim 2, further comprising applying an oxidizing agent to the flue gas either before or after the composition is applied to the gas stream.

19. The process of claim 18, wherein said oxidizing agent comprises at least one of the following: a thermolabile molecular halogen, calcium bromide, a halogen-containing compound, and combinations thereof.

20. The process of claim 2, further comprising monitoring mercury emissions system and responding with the addition of said composition in accordance with the mercury levels in said system.

* * * * *